Feb. 13, 1945. C. D. HAVEN 2,369,350
METALLIZING GLASS
Original Filed Aug. 22, 1940 2 Sheets-Sheet 1

Inventor
CHARLES D. HAVEN.
By
Frank Fraser
Attorney

Feb. 13, 1945   C. D. HAVEN   2,369,350
METALLIZING GLASS
Original Filed Aug. 22, 1940   2 Sheets-Sheet 2
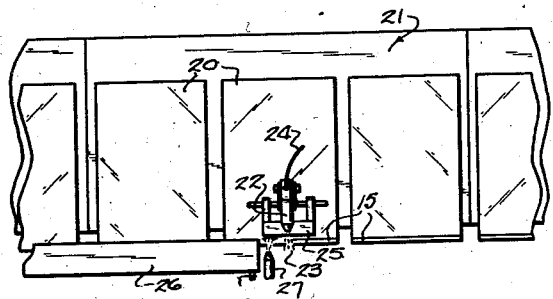
Fig. 3.
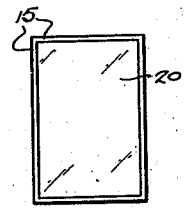
Fig. 4.
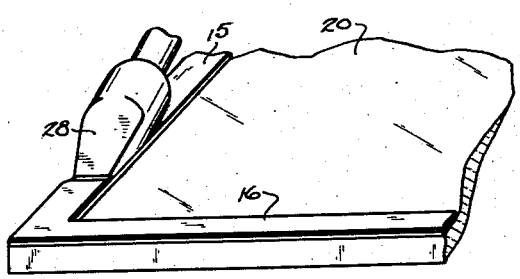
Fig. 5.
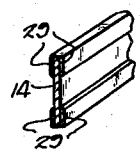
Fig. 6.
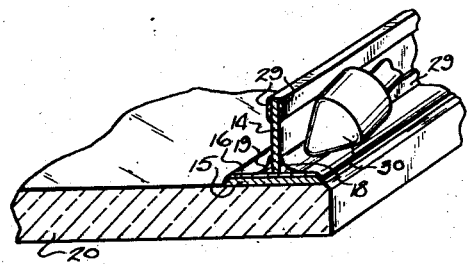
Fig. 7.
Fig. 8.
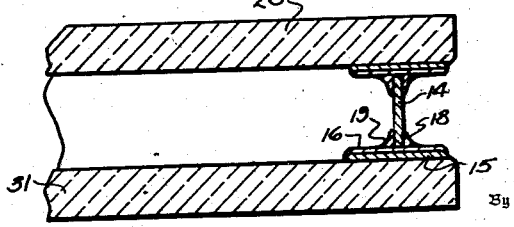
Inventor
CHARLES D. HAVEN.
Frank Graser
Attorney Patented Feb. 13, 1945

2,369,350

UNITED STATES PATENT OFFICE 2,369,350

METALIZING GLASS

Charles D. Haven, Toledo, Ohio, assignor to Libbey-Owens-Ford Glass Company, Toledo, Ohio, a corporation of Ohio Original application August 22, 1940, Serial No. 353,590. Divided and this application February 11, 1942, Serial No. 430,415

4 Claims. (Cl. 117—123.1)

My invention relates broadly to the metalizing of glass and more particularly to the formation of a metal to glass joint.

This application is a division of my copending application, Serial No. 353,590, filed August 22, 1940, entitled "Metalizing glass."

In the uniting of metal to glass by a soldering operation, it is necessary to first prepare a metallic coating upon the surface of the glass to which the solder will readily adhere without adversely affecting the bond between the metallic coating and glass. Also, to insure permanency of the metallic coating, the metal of which it is formed must be of such character and applied to the glass in such a manner as to obtain permanent adhesion therewith.

In my earlier application, Serial No. 297,815, filed October 4, 1939, now Patent No. 2,293,822, granted August 25, 1942, I have disclosed a new and useful alloy to be used in the metalizing of glass and which can be satisfactorily employed as the base coat for subsequent soldering operations. Briefly, the alloy disclosed in that application comprises a mixture of copper and titanium, and the relative percentages given therein by way of example and as having been used by me are ½% to 4½% titanium and the balance copper. I discovered that such an alloy can be sprayed upon the glass in a molten condition with a metalizing gun and that it will become incorporated with the surface of the glass to obtain permanent adhesion therewith.

As explained in my earlier application, Serial No. 297,815, I also discovered that the strength of the bond of the metal to the glass increased as the amount of titanium is increased. Further, that as the amount of titanium is increased, there is an increase in the fracture of the glass surface where the metal spray hits the glass resulting in almost microscopic chips being removed from the glass body. This fracture of the glass surface I term "point shock." This point shock can be controlled to a degree by highly atomizing the metal spray so as to reduce the shock of any appreciable body of high temperature metal striking the glass surface. The effect of fracture to the glass surface, due to higher titanium content, is to bring about a condition where the metal coating on the glass can set up progressive separation from the glass surface, caused principally by the high number of fracture points closely associated with one another.

The present invention constitutes an improvement upon the metalizing of glass as disclosed in my earlier application, Serial No. 297,815. Thus, although the copper-titanium alloy of said application has proven to be quite satisfactory in the metalizing of glass and particularly when used in the making of multiple glass sheet glazing units, I have discovered that the addition of a relatively small amount of chromium to the copper and titanium results in an alloy which may be even more advantageously used in the metalizing of glass and to form a base coat for subsequent soldering operations. For instance, I have found that by the addition of the chromium to the copper and titanium a better bond is obtained between the metal and glass. Another decided advantage in the addition of the chromium is that it has the effect of reducing the point shock upon the glass. Likewise, the addition of the chromium reduces the corrosive action or chemical reaction of the metallic coating thereby affecting the bond of the metal to the glass favorably not only at the glass-metal interface but also in the body of the metal itself. Furthermore, the addition of the chromium to the copper and titanium renders the alloy more resistant to the destructive reactions of the soldering fluxes used in subsequent soldering operations.

My improved alloy may be used in a large number of different ways for the soldering of glass to glass and metals to glass, so that the invention is not limited to the use of the alloy in connection with any particular soldering operation or operations or products. By way of example, however, it might be pointed out that this alloy can be advantageously used in the making of multiple glass sheet glazing units and especially that type of unit comprising two or more sheets of glass spaced apart by metal separator means which are bonded to the glass sheets around the marginal portions thereof, through the intermediary of a metallic coating or coatings, to form an all glass-metal hermetically sealed structure. The metal separator means may consist of one or a plurality of strips, preferably of lead or other ductile metal, extending around the marginal edge portions of the glass sheets and soldered to the metallic coating or coatings thereon.

Other objects and advantages of the invention will become more apparent during the course of the following description, when taken in connection with the accompanying drawings.

In the drawings, wherein like numerals are employed to designate like parts throughout the same:

Fig. 3 is a fragmentary plan view of one form of apparatus which may be used for heating the marginal edge portions of the glass sheets and for applying the metallic coatings thereto;

Fig. 4 is a face view of one of the glass sheets, with the metallic coating applied entirely around the marginal edge portions thereof;

Fig. 5 is a fragmentary perspective view illustrating the depositing of a layer of solder upon the metallic coating on the glass sheet;

Fig. 6 is a fragmentary perspective detail view showing the metal separator strip after it has been pre-coated with solder;

Fig. 7 is a fragmentary perspective view showing the bonding or sweating of the metal separator strip to one of the glass sheets; and Fig. 8 is a fragmentary transverse section through the glazing unit after the metal separator strip has been secured in position between two sheets of glass.

Figure 1:
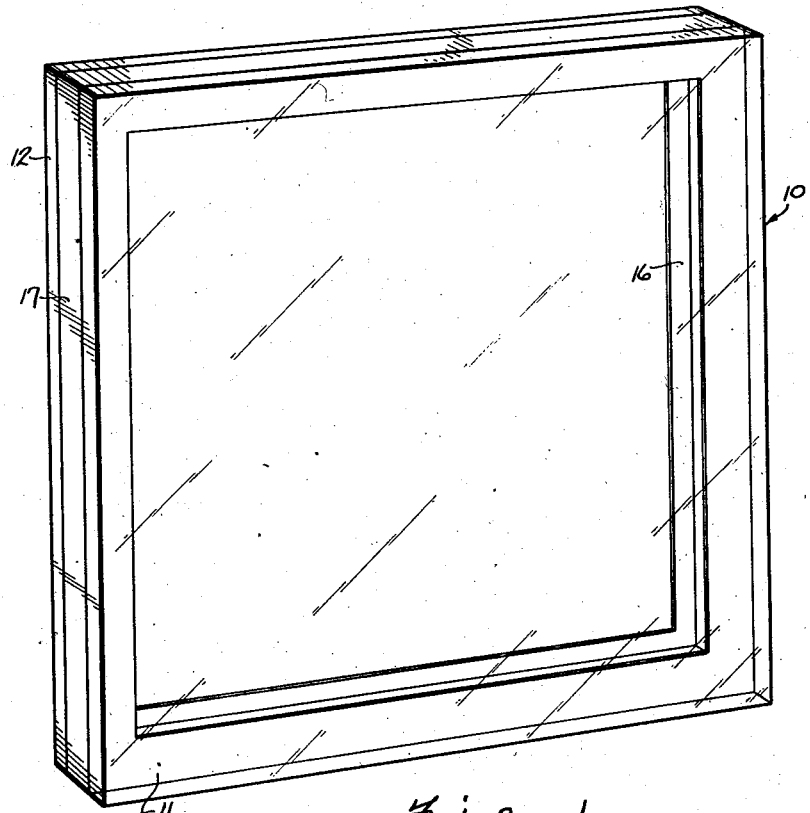
Fig. 1 is a perspective view of one form of multiple glass sheet glazing unit in the construction of which the present invention may be utilized.
Figure 2:
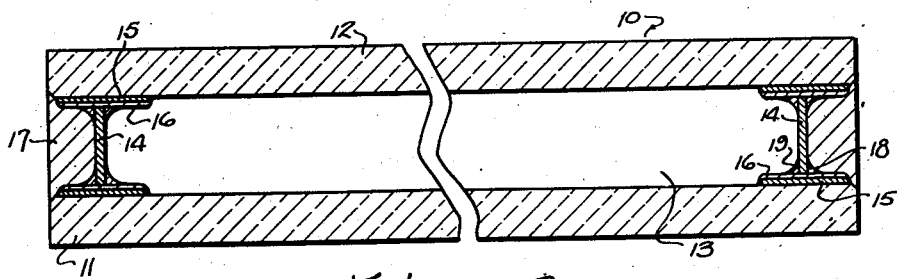
Fig. 2 is a vertical transverse section through the glazing unit.

Referring particularly to Figs. 1 and 2, the numeral 10 designates in its entirety a glass sheet glazing unit produced in accordance with my invention. This glazing unit consists generally of two sheets of glass 11 and 12 arranged in spaced, substantially parallel relation to provide an insulating air space 13 therebetween. This air space is formed by the use of a metal separator strip or strips 14 joined to the glass sheets through the intermediary of the metallic coatings 15 and 16. The separator strips 14 are preferably arranged inwardly of the outer edges of the glass sheets to form a channel which may be filled with a suitable weather-proof seal 17. This seal may consist either of an organic or inorganic material.

As will be readily appreciated, two or more sheets of glass can be fabricated into a glazing unit of this character, giving one or more spaces between adjacent glass sheets as occasion may require. Therefore, while the invention has been illustrated in the drawings and will be herein described as applied to a two sheet unit, it will be understood that the invention is in no way confined to any particular number of glass sheets used or spaces between the sheets.

As explained in my earlier application, Serial No. 297,815, it was customary, prior to that invention, to form the metallic coatings 15 on the glass sheets of pure copper. I found that under proper conditions of application the bond of the copper to the glass surface will be such that in a dry state satisfactory adhesion between the copper and glass can be obtained and that the copper will resist separation from the glass surface by an attempt to scrape the metal from the glass with a sharp razor blade. If, however, the edge of the razor blade is wet with water, the copper coating can be readily removed or peeled from the glass surface without noticeable pressure or effort, with the result that the copper can be completely removed. Since the copper can be removed in the presence of water, it is evident that surface adhesion only has taken place and that this adhesion will fail in use when subjected to strain in the presence of water.

This is of course highly objectionable in any glass metalizing operation and particularly so in the making of multiple glazing units which are exposed to the elements and subjected to all kinds of weather. I have found the "wet scrape test" (i. e., the scraping of the metal with a sharp blade in the presence of moisture) to be an excellent method of determining the strength of bond between the metal and glass and have adopted it as a standard test for this purpose.

After considerable experimental and research work extending over a period of many months, in an effort to render possible the metalizing of glass surfaces by the application of a coating of metal thereto which is not affected by the presence of water or moisture and which can further be satisfactorily used as a base coat for subsequent soldering operations, I discovered that such a metallic coating could be formed on the glass by using an alloy comprising a copper base to which is added a relatively small amount of titanium. As a matter of fact, I found that the addition of a relatively small percentage of titanium to the copper produced phenomenal results which were entirely unexpected. For instance, I found that the bond of the alloy to the glass surface was materially increased in strength and permanency and that it was impossible to remove the metal by scraping it with a sharp blade when dry. Even more remarkable, however, was the discovery that the bond is of such strength and permanency that it will effectively withstand the action of moisture and cannot be entirely removed even when scraped with a sharp blade in the presence of water. Furthermore, the adherence of the metal to the glass surface was not affected by the presence of water or oil and under these conditions resists the various strains to which a multiple glazing unit is subjected in use as well as the action of rain, frost, high humidity, and the oils of putty, when the unit is installed in windows. This phenomenon becomes of great importance when the metalized glass surface is exposed to the elements and in use is subjected to various strains.

The copper-titanium alloy of my earlier application, Serial No. 297,815, can be sprayed upon the glass with a metalizing gun and will adhere to the glass surface in a manner to produce an exceptionally strong and permanent bond between the glass and metal. Since a metal coat formed of such alloy cannot be entirely removed from the glass by the wet scrape test, it will be apparent that there is not merely surface adhesion between the metal and glass but an actual bonding or fusing of the glass surface and the metal of the alloy.

Notwithstanding the fact that the copper-titanium alloy disclosed in my earlier application is quite satisfactory for the purposes intended, I continued my experimental and research work with the view of ultimately finding a more perfect alloy for the metalizing of glass and for forming a base coat for subsequent soldering operations. As pointed out above, I discovered that the addition of a relatively small amount of chromium to the copper and titanium not only results in a noticeable increase in the strength of bond of the metal to glass when subjected to the wet scrape test, but also reduces the corrosive action or chemical reaction of the metallic coating both at the glass-metal interface and in the body of the metal; resists destructive reactions of the soldering fluxes, and offsets the tendency of the titanium to produce point shock in the glass.

Although it is to be expressly understood that my invention is not limited to the use of any specific proportions or percentages of copper, titanium and chromium, I would suggest the use of an alloy comprising approximately 1.75% to 2.25% titanium, approximately .40% to .60% chromium and the balance copper, with no noticeable impurities. As a specific example, I have used with very satisfactory results, an alloy wire containing 1.92% titanium, .40% chromium and the balance copper. Obviously, it will be appreciated that the relative proportions of titanium, chromium and copper may be varied to suit different conditions and different metalizing operations.

As stated above, I discovered that the strength of the bond of the metal to the glass increases as the amount of titanium is increased, but that the increase in the amount of titanium used has a corresponding increase in the amount of point shock upon the glass. However, the point shock resulting from the titanium is not only reduced to some extent by the addition of the chromium but also that which does take place is finer and more or less evenly distributed.

It is preferred that the separator strips 14 be made from lead and that the lead strips and metallic coatings 15 on the glass sheets be joined together by means of the layers 16 of solder or other inorganic bonding material. The soldering of the parts together is in effect a sweat job and the materials are so controlled both as to composition and form that reinforcing or strengthening fillets or accumulations of solder 18 and 19 are formed on both sides of the separator strips to strengthen the construction and thus help to insure its permanency as will be more clearly hereinafter described.

The use of ordinary solder results in relatively high working temperatures with the soldering irons or other sources of heat whereby undesirable strains may be set up between the metal and the glass. Therefore, it is preferred to make use of a low melting point solder with a wide plastic range of melting to reduce the temperature of applications and make use of a more plastic range of the solidifying points of the solder for the purpose of easier assembly. There are a number of variations of soft solders which can be used and one which I have found to work satisfactorily consists of approximately 10 parts bismuth, 40 parts lead, and 50 parts tin.

Although, as stated above, the glass may be metalized when cold, it is preferred, especially in the fabricating of multiple glazing units, that the marginal edge portions of the glass sheets to be metalized be heated prior to the spraying of the metal thereon. In Fig. 3 is illustrated one type of apparatus and method which can be used for heating the glass sheets and for applying the metallic coatings 15 thereto. As shown, the glass sheets 20 to be metalized rest horizontally upon and are carried forwardly by a suitable conveyor 21 beneath a metalizing gun 22. This gun may be of any conventional construction capable of producing a spray of molten metal 23 which can be directed upon the preselected portions of the glass sheets moving thereunder. I prefer that a spray gun be used in which the copper-titanium chromium alloy wire 24 is fed into the gun, melted, and sprayed in fine particles upon the glass. The deposit of metal upon the glass is not only controlled by the relative position of the gun with respect to the glass, speed of wire through the gun, and speed of movement of the glass, but also by a guard member 25 which may be used for this purpose.

The metallic coating formed upon the glass must be neither too heavy nor too thin to give satisfactory results. If too heavy, contraction strains in cooling will cause the alloy to lift glass particles from the glass surface in a progressive manner whereby the metal can be partially or wholly removed from the glass. If too thin, it will not provide a proper base for soldering operations as too much glass surface may be exposed. As a guide to thickness, I preferably use a thickness of metal which will just prevent the subsequent solder coating from showing through the glass and sprayed metallic coating. I find that this makes an excellent guide for metal thickness.

Before the metal is sprayed upon the glass, the marginal portions of the glass sheet are first heated to the desired temperature. The exact temperature used will vary somewhat with the size and thickness of glass, but in all cases where heating is resorted to, care should be exercised to avoid warpage of the glass. For ordinary plate and window glass, I have found a temperature of between 500 and 600 degrees F. to be satisfactory although this temperature may be varied to suit the particular metalizing operation. In fact, in some cases it may not be desired to heat the glass at all.

The alloy herein provided is of great value in permitting a satisfactory bond when applied to cold or cool glass. In metalizing glass sheets wherein the edges thereof are heated, I find that the glass, as for illustration glass ⅛ inch thick, will become bent or distorted at a given temperature, whereas thicker glass, as for illustration ¼ inch thick, may remain perfectly flat at the same glass temperature. If the temperature is raised in both cases, it is possible for glass breakage to take place. It is therefore obvious that the ability to lower the glass temperature when metalizing the edges, as described, will be of practical benefit.

In order to provide a strong enough bond with other metals, such as pure copper, it has been found necessary to use high glass temperatures since proper bonding, even when subjected to a scrape test with a dry razor blade would show a weak bond if the glass was not heated. The alloy herein described, however, reacts in an entirely different way, in that equivalent bonds may be produced with lower glass temperatures if and when the size of the glass or thickness of the glass requires low glass temperatures to be used. While lower glass temperatures can also be used with the copper-titanium alloy of my earlier application, Serial No. 297,815, I have found that the addition of the chromium permits a still cooler glass temperature to be used to produce equivalent results for any given glass thickness.

As the glass sheet is carried along by the conveyor 21 and before it reaches the metal spray gun 22, the forward marginal edge portion of the sheet, which projects beyond the conveyor, passes through an electrical heating device 26. The number of heaters and length of heating zone are dependent upon the speed of the machine and exact operating temperatures desired. After the glass sheet passes beyond the heating device 26 and just before the metal is sprayed thereon, the marginal edge portion thereof is subjected to the action of one or more burners 27 which heat the surface of the glass to the desired maximum temperature for the reception of the metal spray.

The heating means is so controlled that when the glass reaches a position under the metal spray gun, it is within the predetermined temperature range desired. The conveyor 21 is preferably moved continuously forwardly and successive sheets of glass are presented progressively to the spray of metal 23 issuing from the gun 22.

Although it is preferred that the marginal edge portion only of the glass sheet be heated, the entire sheet may be heated if desired, and in some cases this may be found more satisfactory. The invention is also not limited to the use of any particular air pressure for atomization of the metal and, likewise, a wide range of flame and spray metal temperature can be used. Various gases and combinations of gases can also be used in the spraying operation, such as, for example, acetylene, propane, and hydrogen, in combination with oxygen.

After one edge or marginal portion of the glass sheet has been coated with metal, it is of course necessary to similarly treat the remaining edges or marginal portions before fabricating the glass into a multiple glazing unit. A glass sheet 20 having the four marginal portions thereof provided with the metallic coating 15 is shown in Fig. 4.

After the metallic coating 15 has been applied to the glass sheet, it is then further prepared by applying thereto the layer 16 of solder which, as stated above, consists preferably of a low melting point solder. To insure a firm bond, a suitable soldering flux, of which there are a large number, is preferably used to obtain a permanent satisfactory union between the solder layer 16 and metallic coating 15 on the glass. This flux can be applied to the metallic coating by means of a brush or in any other desired manner. However, after the metallic coating 15 has been applied to the glass, there is a tendency toward oxidation thereof. Therefore, to facilitate tinning of the metal coated glass, this oxidation should be removed before the flux is applied and for this purpose the metallic coating may be subjected to a fine hydrogen flame. The flux treated metallic coating may then be coated with the layer of solder 16 in the manner shown in Fig. 5, wherein a soldering iron 28 is being run over the metallic coating to leave the solder layer thereon.

After two sheets of glass have been provided with the metallic coatings 15 and 16 they are adapted to be secured together in spaced substantially parallel relation as shown in Fig. 1 by means of the interposed metal separator strips 14. The separator strips 14 are preferably formed of lead or a lead alloy and to enable joining of the strips to the metal coated glass sheets there is applied to both sides of the strips along the marginal edges thereof, first a flux and then a deposit of solder 29 (Fig. 6).

The solder deposits 29 applied to the edges of the separator strips 14 consist preferably of a low melting point solder having a wide plastic range with a minimum plastic temperature. The use of a low melting point solder is also of benefit during the time of sweating the soldered metallic coating on the glass to the soldered lead separator strip whereby a low temperature iron may be used without danger of melting down the lead strips.

To join the prepared metal separator strips 14 to one of the glass sheets, they are associated therewith substantially as shown in Fig. 7. Ordinarily, it is desirable to place the separator strips back from the edges of the glass sheet and approximately centrally of the metallic coating 15 to produce the channel for receiving the weather-proofing seal 17, although this is of course a matter of choice.

An electric iron 30 or other heating means may be employed to elevate the temperature of the solder deposits 29 and the solder coating 16 to induce flowing of the solder to produce a fillet 18 on one side of the separator strips and a second fillet 19 on the opposite side of said strips. In this way, the solder completely surrounds the edges of the separator strips giving what may be called a sweat joint and producing fillets on both sides of the separator strips to give a balanced type of joint capable of standing strain and stresses in both directions laterally of said separator strips.

For purposes of illustration, the fillets 18 and 19 are shown as separate from the layer of solder 16 on the metallic coating 15. While these solder deposits are of course independent of one another initially, part of the solder being applied originally to the separator strips and the other solder being applied to the metalized coating on the glass, during the joining together the solder of course blends or amalgamates into a single mass or volume of solder permanently adherent to the separator strips and metalized coating on the glass and shaped as fillets for mechanical strength.

In joining the metal separator strips 14 to the first sheet of glass, it is obviously possible to apply the soldering iron 30 to both sides of the separator strips for soldering purposes, but this of course is impossible when the second sheet of glass is being joined to the separator strips. However, by preparing the separator strips 14 with substantial deposits of solder 29 on both sides thereof, the heat applied on one side of the strips is sufficient to cause proper flowing of the solder on both sides. That is, in Fig. 7 proper control of temperature application with the iron 30 in the manner shown will result in the formation of not only the fillet 18 upon that side of the separator strips in contact with the iron but will also result in formation of the fillet 19 on the opposite side of the separator strips.

After the separator strips have been joined to the first sheet of glass, the assembly so formed is then preferably inverted over a second sheet of glass 31 as illustrated in Fig. 8, and the soldering job completed by operating the iron or other heating element on the exterior coating of solder 29 carried by the separator strips 14. This, as has already been explained, will result in sweating together or joining the separator strips and prepared metallic coatings on the glass as well as formation of the fillets 18 and 19. While I have referred to the separator means as comprising metal strips, a single length of metal may be used for the separator and shaped to form a continuous strip.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. A joint between a glass element and a metal element, including a sprayed metallic coating applied to the glass element formed from an alloy comprising approximately 1.75% to 2.25% titanium, approximately .40% to .60% chromium and the balance substantially all copper, and a solder connection between the metallic coating on the glass and the metal element.

2. The process of metalizing glass, including the step of spraying a molten metal alloy upon the glass comprising approximately 1.75% to 2.25% titanium, approximately .40% to .60% chromium and the balance substantially all copper.

3. The process of metalizing glass, including the steps of heating those portions of the glass to be coated, and then spraying upon the glass while heated a molten metal alloy comprising approximately 1.75% to 2.25% titanium, approximately .40% to .60% chromium and the balance substantially all copper.

4. The process of metalizing glass to form a base coat for subsequent soldering operations, including the step of spraying a molten metal alloy upon the glass comprising approximately 1.75% to 2.25% titanium, approximately .40% to .60% chromium and the balance substantially all copper, and in controlling the application of the molten metal to the glass so that the thickness thereof will be sufficient to prevent a coating of solder applied thereto from showing through the glass.

CHARLES D. HAVEN.